United States Patent [19]

Lewis, Jr.

[11] Patent Number: 4,690,277

[45] Date of Patent: Sep. 1, 1987

[54] PREPACKAGED FUSED SYNTHETIC BRUSHES

[75] Inventor: John C. Lewis, Jr., Salisbury, Vt.

[73] Assignee: Tucel Industries, Inc., Forest Dale, Vt.

[21] Appl. No.: 884,941

[22] Filed: Jul. 14, 1986

Related U.S. Application Data

[63] Continuation-in-part of Ser. No. 709,667, Mar. 8, 1985, Pat. No. 4,619,485.

[51] Int. Cl.$^4$ .......................... A46B 9/04; A46B 15/00; A46D 3/04; B65D 69/00
[52] U.S. Cl. .................. 206/362.1; 206/362; 15/167 R; 15/167 B; 211/66
[58] Field of Search .................. 206/361, 362, 362.1, 206/362.2, 362.3, 820, 343; 15/167 R, 167 B; 300/21; 211/65, 66

[56] References Cited

U.S. PATENT DOCUMENTS

| | | | |
|---|---|---|---|
| 1,773,651 | 8/1930 | Tourtois | 15/167 B |
| 3,545,025 | 12/1970 | O'Connell | 300/21 |
| 3,744,078 | 7/1973 | Vallis | 15/167 B |
| 3,951,460 | 4/1976 | Blankschein | 300/21 |
| 4,472,357 | 9/1984 | Levy et al. | 206/820 X |
| 4,614,485 | 10/1986 | Lewis, Jr. | 300/21 |

Primary Examiner—William Price
Attorney, Agent, or Firm—Lowe, Price, LeBlanc, Becker & Shur

[57] ABSTRACT

The product consisting of fused synthetic tufted brushes comprising at least two or more integrally connected brushes joined with a means consisting of a package-type retainer in order that the connected brushes may be hung or displayed for consumer purchasing. The connected means may be subsequently removed in order to allow use of an individual brush.

11 Claims, 24 Drawing Figures

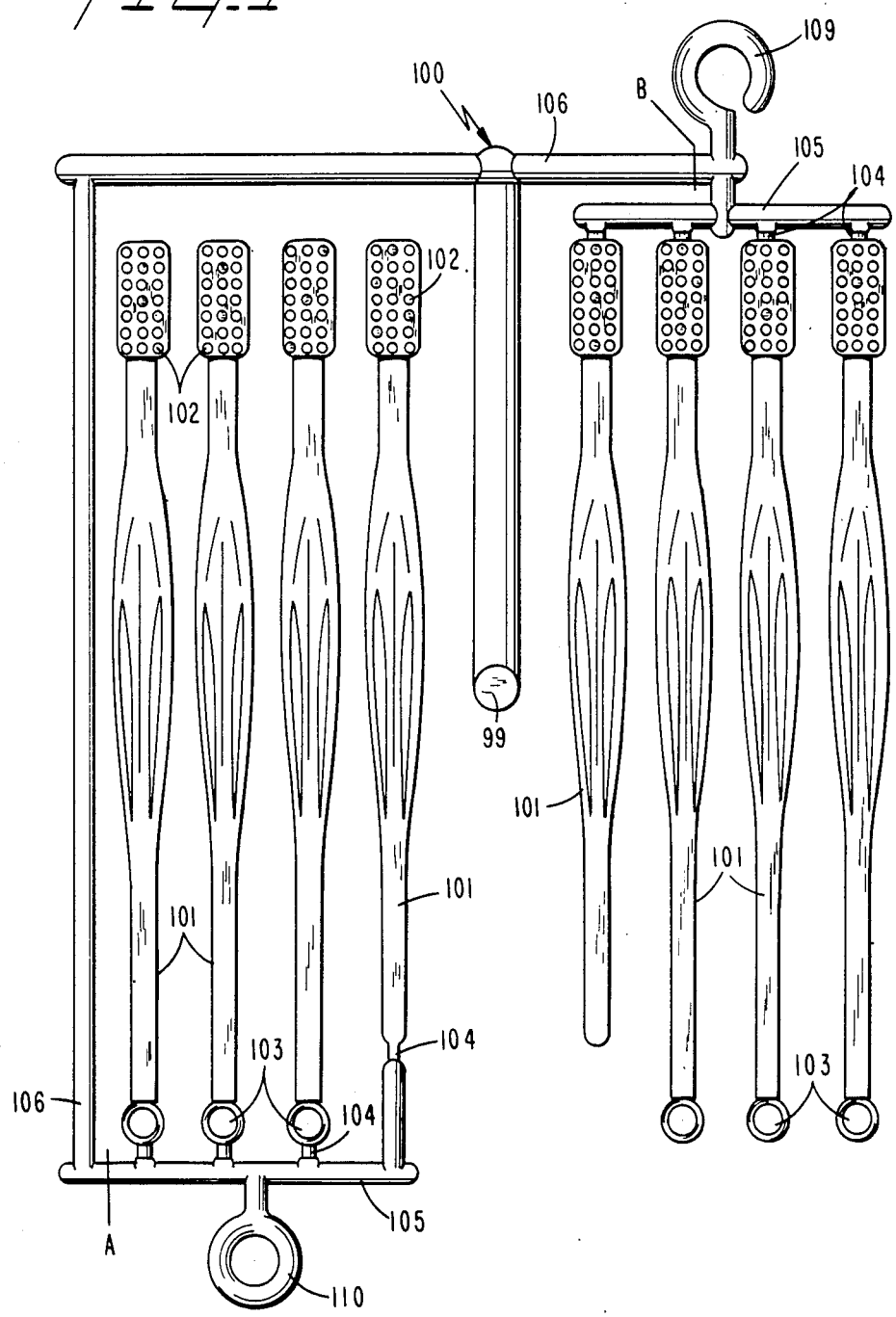

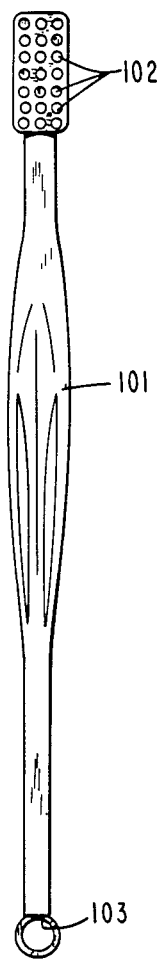
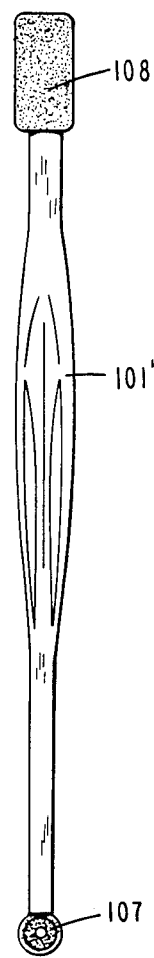
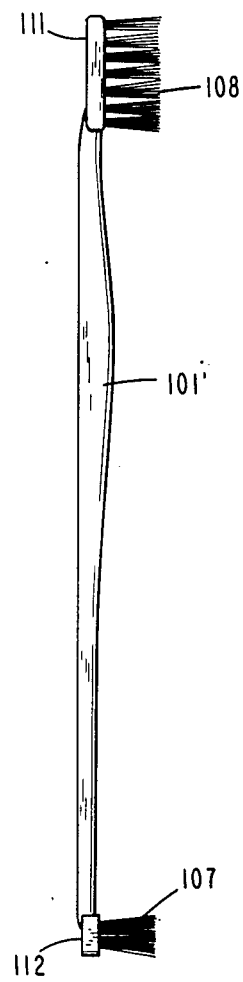

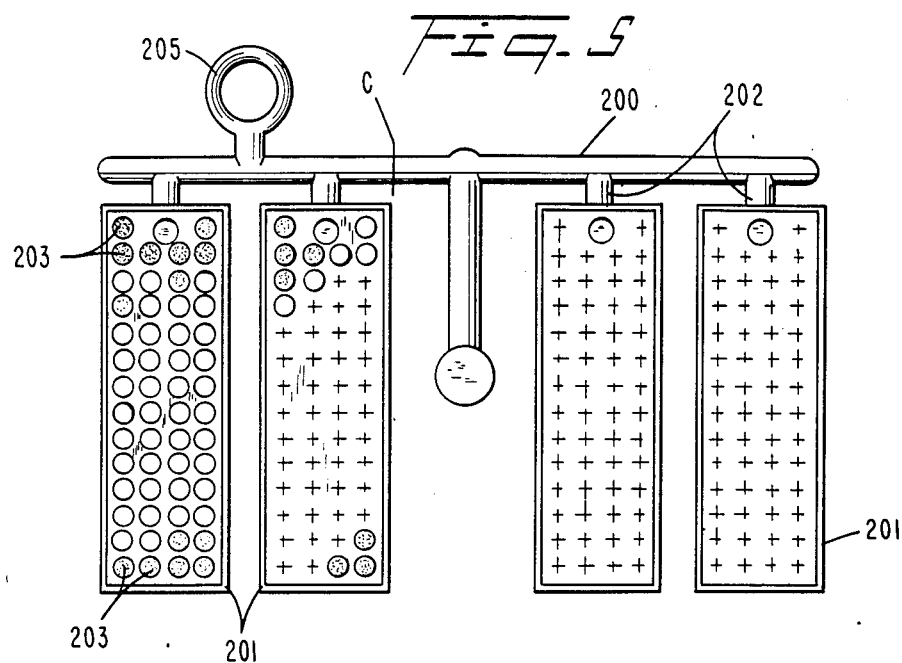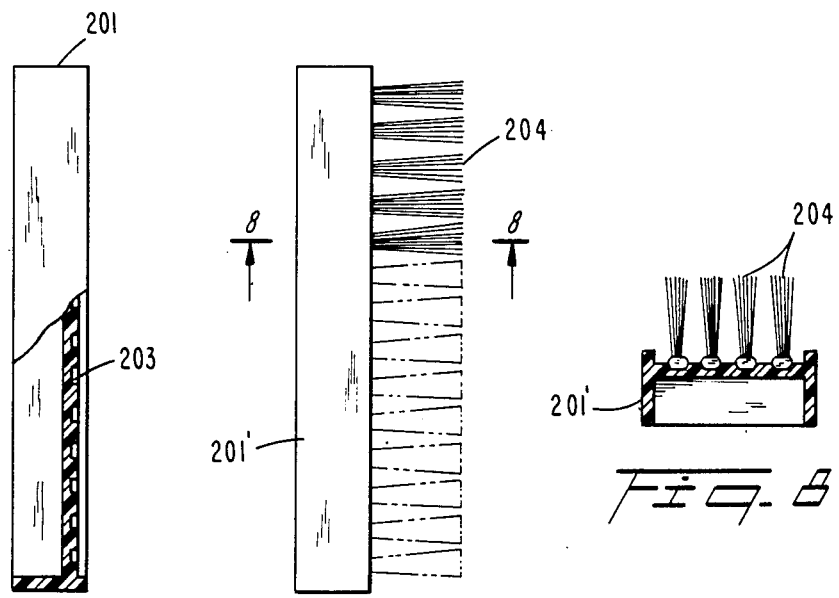

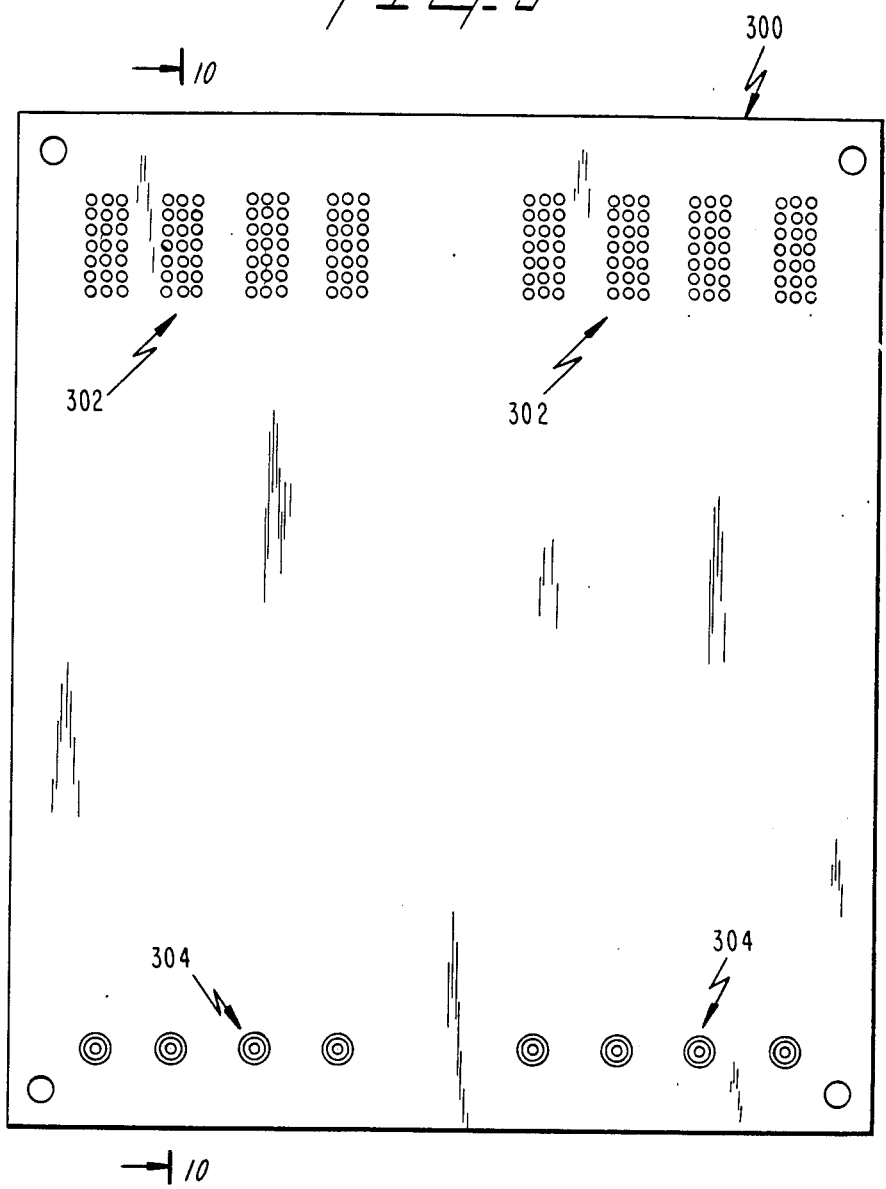

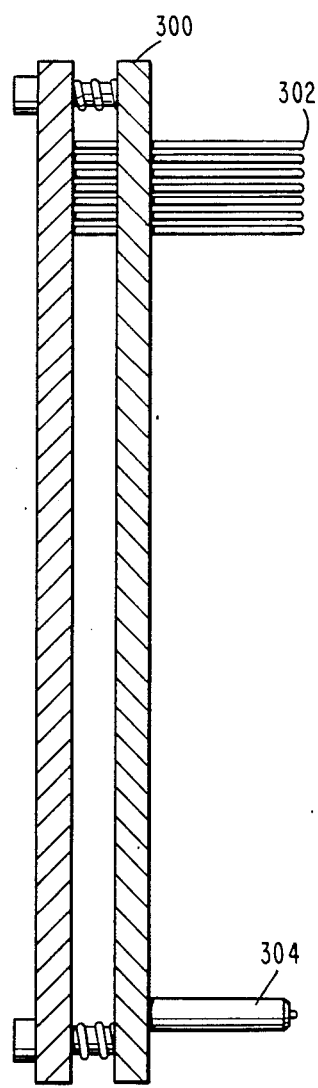
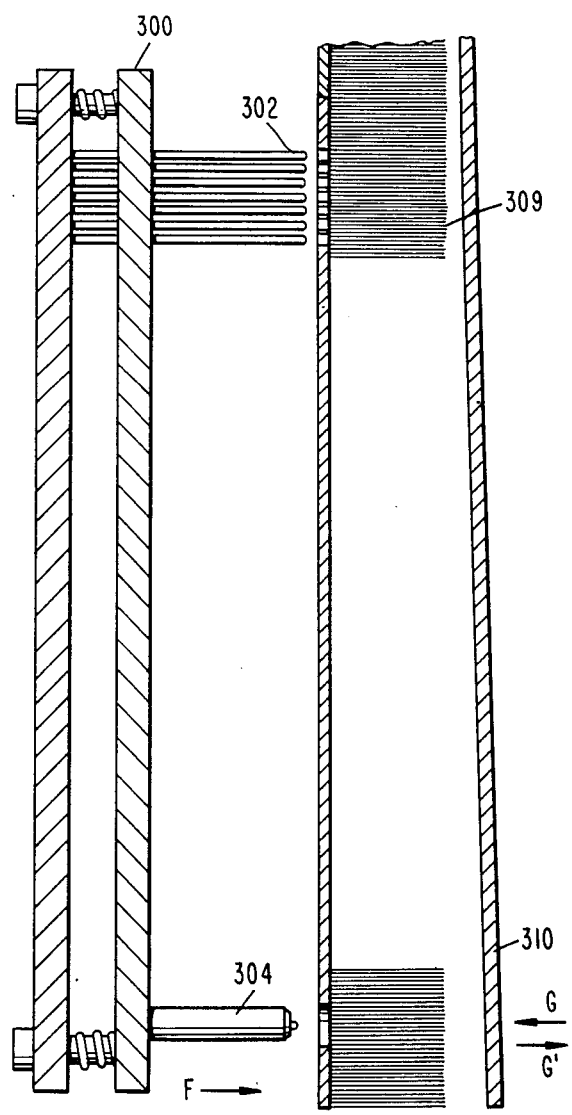

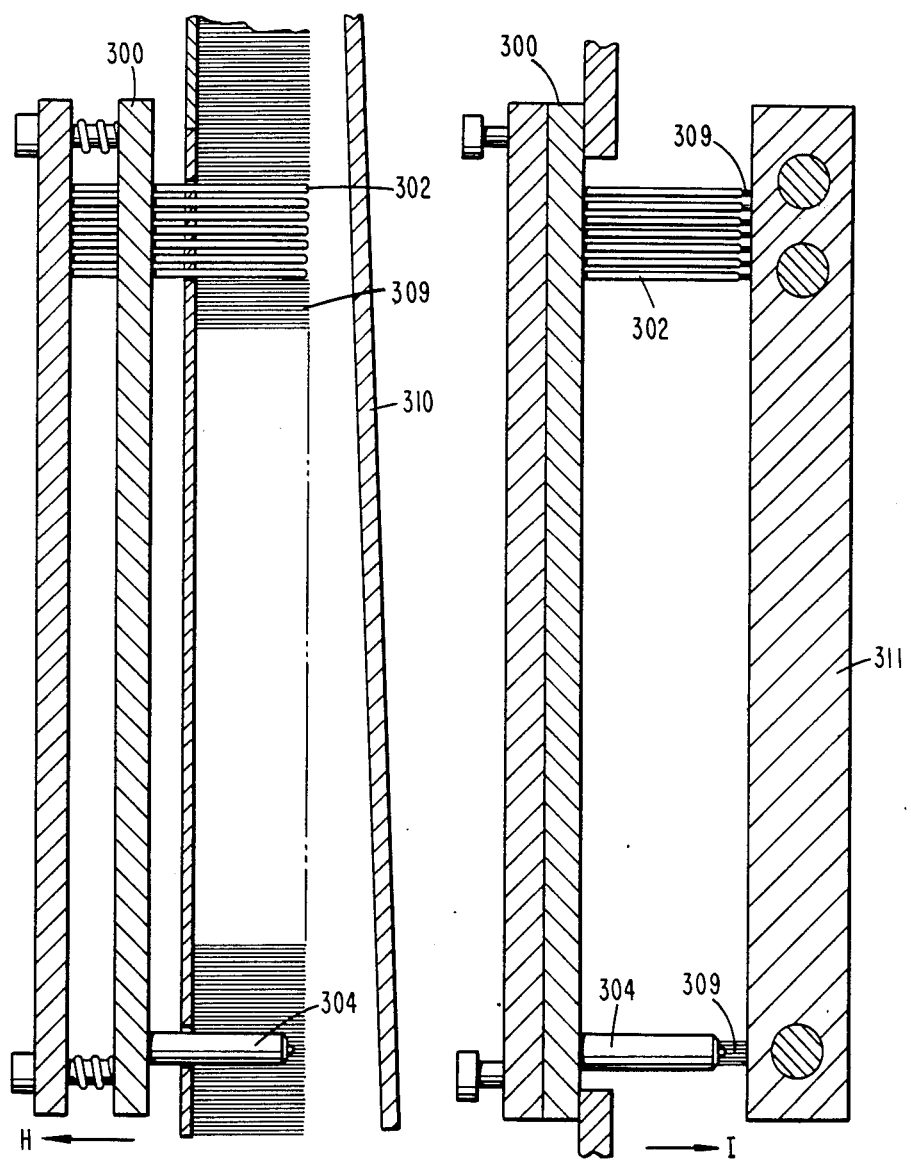

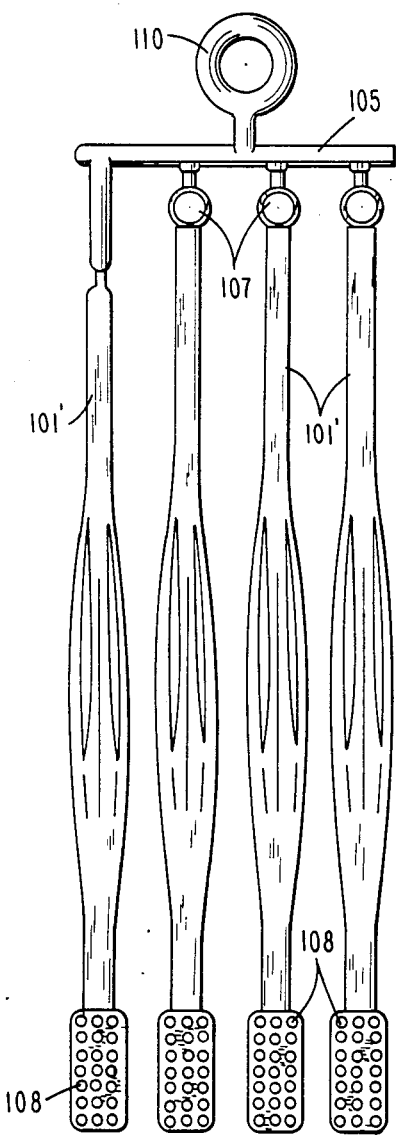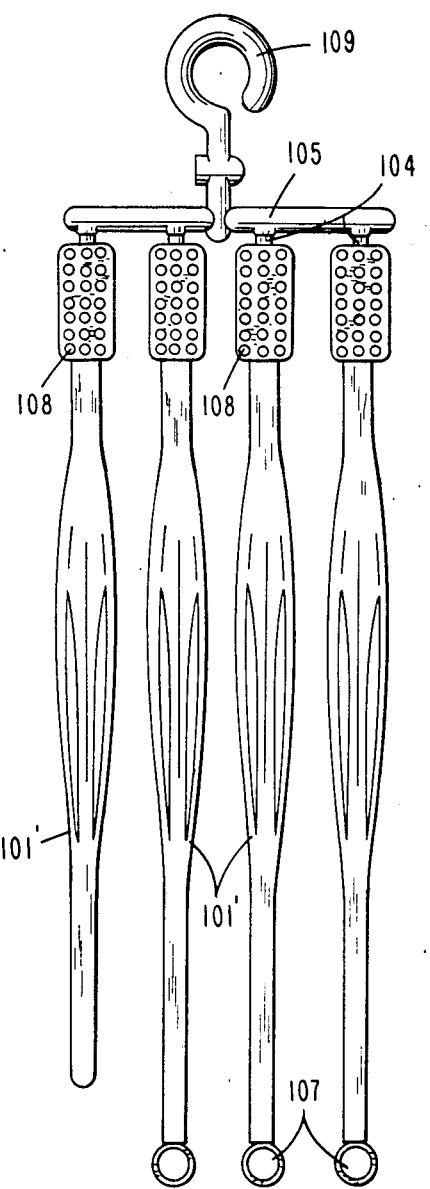

PREPACKAGED FUSED SYNTHETIC BRUSHES

This application is a continuation-in-part of my co-pending patent application Ser. No. 709,667, filed Mar. 8, 1985, now U.S. Pat. No. 4,619,485.

This invention relates to interconnected fused synthetic brushes whereby there are at least two or more brush products integrally connected together by a means consisting of a package-type retainer, i.e., hook means, whereby the brush products may be displayed for consumer purchasing. After the products are purchased by a consumer, the product may be removed or disconnected from the retaining means by twisting or cutting the gate or interconnected portion.

Prior to the invention of fused brush tufts, brooms and brushes used for sweeping or cleaning were manufactured by inserting one tuft at a time into a preformed slot or hole in a brush block. Brooms or brushes were constructed of natural fibres, animal hair, or synthetic filament. Tufts thereof were normally first formed and then inserted into a slot or hole in a substrate such as a brush block. After being inserted therein, the tuft would be fastened with, for example, a staple, a wire, or glue. As noted, this method of manufacture was time consuming in that it was limited to tufting a brush block one tuft at a time.

In my prior patents, for example, U.S. Pat. Nos. 3,471,202; 3,596,999; 3,604,043; 4,189,189; 4,291,431 and 4,348,060, there is described a method and apparatus for fusing multiple tufts of synthetic filament simultaneously and forming therewith brush and broom constructions. This method permitted the simultaneous manufacture of a brush or multiple fused synthetic filament tufts and thereby rendered obsolete the prior methods of brush construction which included tufting one tuft at a time. These inventions allowed the manufacture of completely synthetic brushes and brooms in a much shorter time. However, these inventions were directed to forming brush or broom units one at a time. Each brush or broom unit then in a single operation was tufted with multiple tufts of fused synthetic filaments, and even though all tufts on a single unit were fused and mounted simultaneously, each unit was handled separately.

It has become increasingly important to establish high volume manufacturing methods in order to reduce handling, labour costs and production time. Therefore, methods whereby more than one complete brush construction can be simultaneously fused, trimmed and handled in a single operation are important.

The present invention provides a novel packaging construction whereby it becomes possible to mold the brush product substrate integrally and simultaneously with a packaging means.

Objects and advantages of the invention will be set forth in part hereinafter and in part will be obvious herefrom, or may be learned by practice with the invention, the same being realized and attained by means of the combinations, compositions and improvements pointed out in the appended claims.

The invention resides in the novel steps, methods, combinations, compositions and improvements herein shown and described.

The objects of this invention will now be described. An object of the invention is to provide a frame comprising at least two fused tufted synthetic brush constructions integrally connected by a hanger means for subsequent display. A further object of this invention is to provide an integrally connected display means connected between at least two brush constructions whereby the brushes can be twisted or cut from the display means and result in individual brushes.

Yet another object of this invention is to provide an integrally connected toothbrush frame comprising fused tufted synthetic filament onto a 2 to 3 mm molded head section resulting in a display package containing super thin toothbrushes.

According to the present invention there is provided a method for simultaneously producing a plurality of synthetic fused filament tufted brushes, comprising the steps of moulding a thermoplastic brush blocks integrally connected thereon by gates between each brush block and said frame;

supporting the frame and integrally connected blocks by a support means;

providing a plurality of tuft pickers in a preselected design corresponding to the design of tufts to be applied to said brush blocks;

picking a plurality of synthetic fibre tufts with said pickers whereby said tufts are contained within said pickers with ends exposed;

fusing simultaneously the ends of each of said tufts;

indexing said fused tuft ends into said brush blocks whereby said brush blocks are simultaneously tufted with a plurality of synthetic filament tufts in a preselected design;

separating said pickers from said tufts to provide a plurality of tufted brushes mounted on said frame.

The brush block substrates are premoulded in a single integral frame unit and said frame is then inserted in a block-holding device. All blocks then in a frame are tufted with fused tufts in a single step whereby said plurality of brushes may be formed in a short period of time, such as five to six seconds. Subsequently, the finished brushes are separated from the frame.

An embodiment of the present invention will now be described, by way of an example, with reference to the accompanying drawings, in which:

FIG. 1 is a front view of a frame according to the present invention containing eight toothbrush blocks;

FIG. 2 is a front view of a single toothbrush block as removed from the frame of FIG. 1;

FIG. 3 is a front view of a tufted toothbrush as removed from the frame of FIG. 1;

FIG. 4 is a side view of the tufted toothbrush of FIG. 3;

FIG. 5 is a front view of a frame containing two nail brush blocks;

FIG. 6 is a side view in partial section of a brush block as removed from the frame of FIG. 5;

FIG. 7 is a side view of a tufted nail brush as removed from the frame construction of FIG. 5;

FIG. 8 is a cross sectional view taken along the line 8—8 of FIG. 7;

FIG. 9 is a front view of a tuft-forming picker of this invention;

FIG. 10 is a side view in partial section of the tuft-forming picker of FIG. 9 taken along the line 10—10 of FIG. 9;

FIG. 11 is a side view in partial section of the tuft-forming picker of FIG. 9 prior to indexing into a filament stock box;

FIG. 12 is a side view in partial section of the tuft-forming picker of FIG. 9 indexed into a filament stock box;

FIG. 13 is a side view in partial section of the tuft-forming picker of FIG. 9 withdrawn from the filament stock box with the picking tube support and trim ends in a closed attitude and filament ends disposed against a melter block for fusing;

FIG. 16 is a front view of a frame according to the present invention containing four tufted toothbrushes as detached from the manufacturing frame at point A in FIG. 1;

FIG. 17 is a front view of a frame according to the present invention containing four tufted toothbrushes as detached from the manufacturing frame at point B in FIG. 1;

Figure 14:
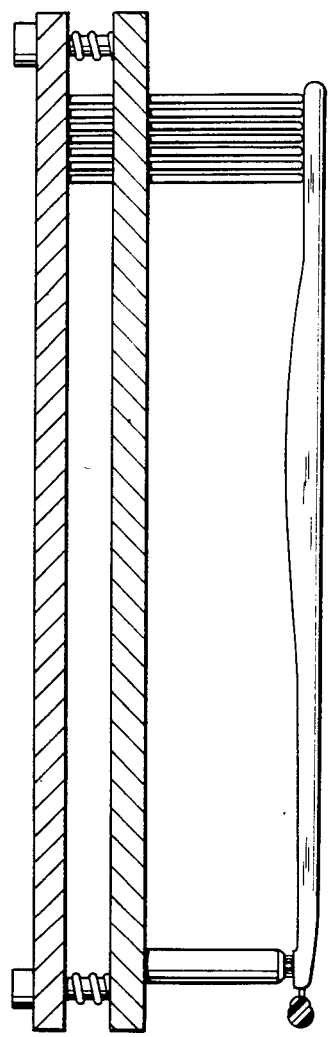
FIG. 14 is a side view in partial section of the tuft-forming picker of FIG. 9 with the fused tuft ends mounted on a framed toothbrush handle.

With reference to the drawings and to FIG. 1 in particular, the moulded toothbrush handle frame 100 of this invention is shown therein with eight toothbrush handles 101 integrally mounted to the frame 100 by means of gates 104 and connecting runners 106. The handles 101 have premoulded tufting acceptance sections 102 and 103 at either end thereof. The frame 100 was moulded by injection moulding employing a hot runner system whereby the molten polypropylene resin was injected in the mould through a point 99 and was allowed to create the frame/handle section. During ejection, the whole frame 100 including the moulded toothbrush handles 101 was integrally connected to runners 106 across gates 104 in order to use the entire frame during fusing.

Frame 100 also contains runner sections 105 which directly connect the toothbrush handles through gates 104 with frame runners 106 and hanger means 109 and 110. Hanger means 109 and 110 allow for a self-contained frame of four toothbrush handles 101.

The toothbrush handles 101 of this invention are fused at each end in a single step. With reference to FIG. 2, the handle 101 has two fusing sections 102 and 103. Section 102 is designed to accept twenty-one filament tufts while the opposite section 103 is designed to accept a single hollow fused circular tuft simultaneously.

Thus, by fusing one frame 100 containing eight toothbrush handles 101 every ten seconds, it is possible to tuft approximately 2,640 toothbrushes per hour. The fastest known stapling brush machines can only tuft up to about 800 toothbrushes per hour. In terms of labour costs, this new tufting method, by employing the frame 100, can lower tufting costs by 70% and increase productivity by 70%.

After the toothbrushes 101' have been tufted, they are removed from the frame 100 by cutting across the moulded gates 104 to yield a brush as illustrated in FIGS. 3 and 4.

Figure 15:
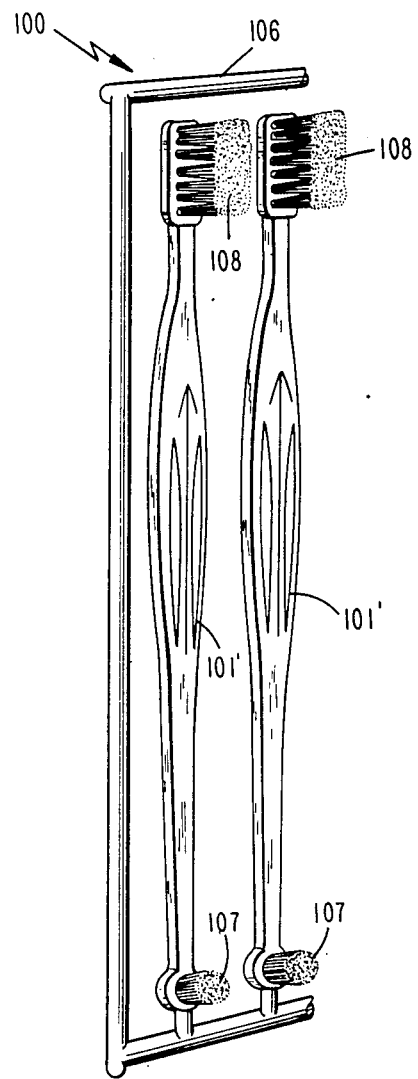
FIG. 15 is a perspective view of the tufted toothbrush frame of FIG. 1.

It is also possible, as would be obvious to those skilled in the art, to mould the frame 100 in such a manner that the frame may act as a package for the tufted brushes after fusing, with the customer separating the individual brush from the frame 100. FIG. 15 illustrates this concept of marketing toothbrushes 101' having tufts 107 and 108 held in a multiple toothbrush frame 100 interconnected by runners 106.

Figure 18:
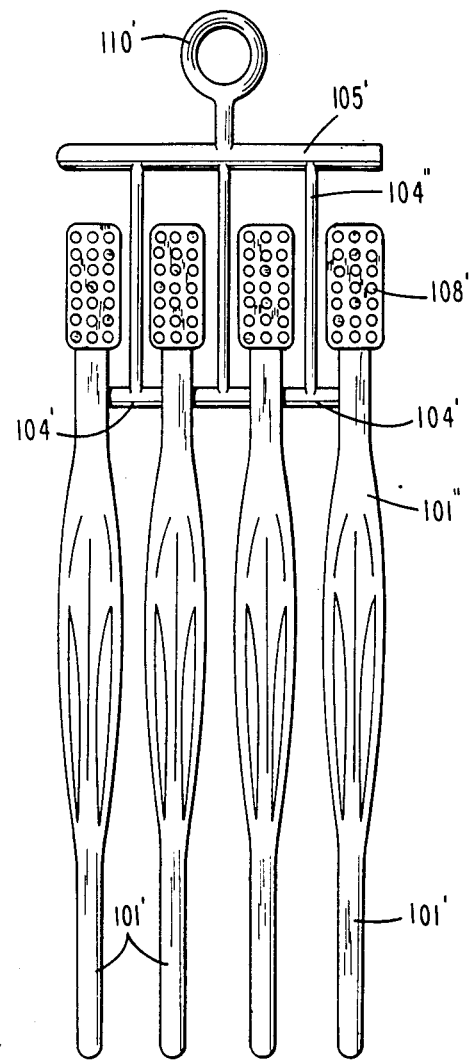
FIG. 18 is a front view of a frame of four tufted toothbrushes as manufactured in accordance with the present invention illustrating the connector means.

Additionally, single frames containing four fused toothbrushes 101' held together by hanger means may be obtained. FIG. 16 illustrates a complete frame of four toothbrushes 101; as detached from the tufting frame 106 FIG. 1 at position A as integrally held together through gates 104, runner 105 and hanger means 110. The user may remove an individual brush unit 101' by twisting or cutting the brush free from the gate 104. FIG. 17 illustrates further an additional type of hanger means in the form of a hook-like construction 109. FIG. 18 yet further illustrates other types of attachment means and hanging constructions by which a way is provided to separate the toothbrushes 101' from gates 104' at a position located away from the area of the tufted brush head 108' in order that any sharp edges of plastic remaining from the twisting off of the brush handle 101' from gate 104' will not interfere with the brushing of teeth where the head section 108' could come into contact with the gums and/or walls in the mouth. As illustrated in FIG. 18 the gate 104' are connected to thinner gates 104'' and runner 105' which in turn is connected to a hanger means 110'.

Figure 19:
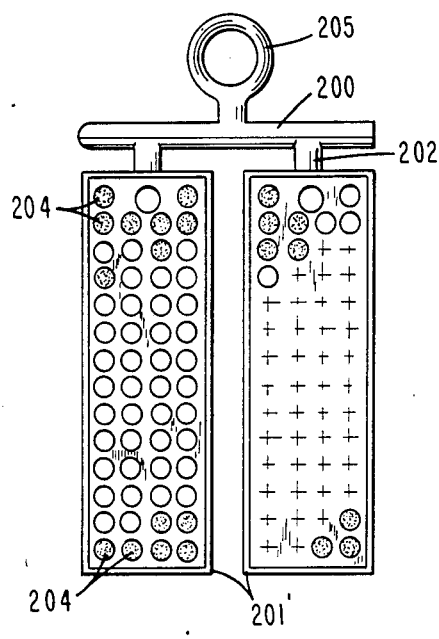
FIG. 19 is a front view of a frame of two tufted nail brushes as manufactured in accordance with the present invention illustrating the connector means as detached from the manufacturing frame at point C in FIG. 5.

Referring now to FIGS. 5 to 8, a frame 200 may also be utilized to mount integral brush backs 201 with gates 202 as connected through runner (frame) 200 containing hanger ring 205. The overall frame 200 then, as described with toothbrushes, may be employed to form nail scrub brushes or the like. Each brush back (block) 201 has, for example, forty-four tuft receiving apertures 203. After the tufting process is complete, a nail scrub brush 201' will be formed containing synthetic filament tufts 204 fused integral with the tuft receiving apertures 203 and mounted thereon. By detaching frame 200 at section C, a display package containing two tufted nail scrub brushes results as illustrated in FIG. 19, with hang-up ring 205 connected through runner 200 and gates 202 to the brush 201'.

Figure 20:
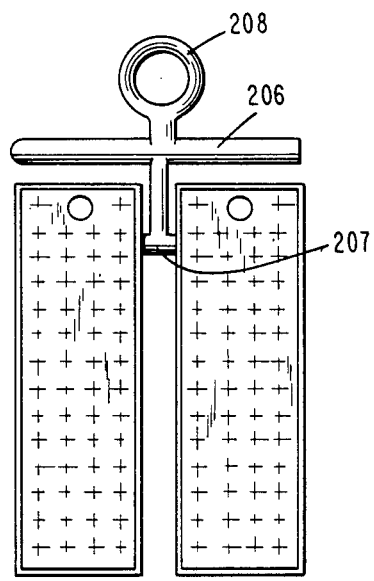
FIG. 20 is a front view of a frame of two tufted nail brushes as manufactured in accordance with the present invention illustrating a connector means.
Figure 21:
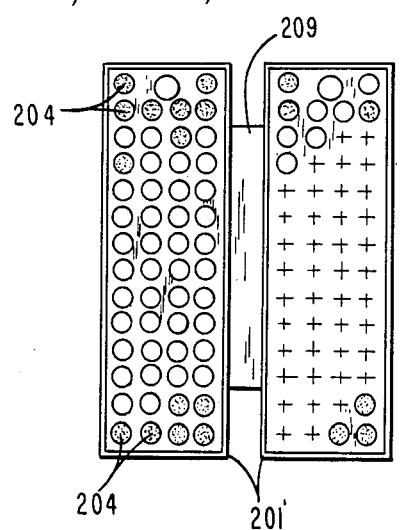
FIG. 21 is a front view of a frame of two tufted nail brushes as manufactured in accordance with the present invention illustrating another type of connector means.
Figure 23:
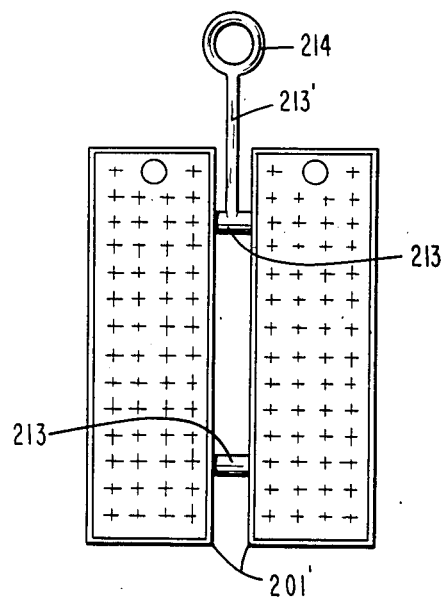
FIG. 23 is a front view of a frame of two tufted nail brushes as manufactured in accordance with the present invention illustrating yet another connector means.
Figure 22:
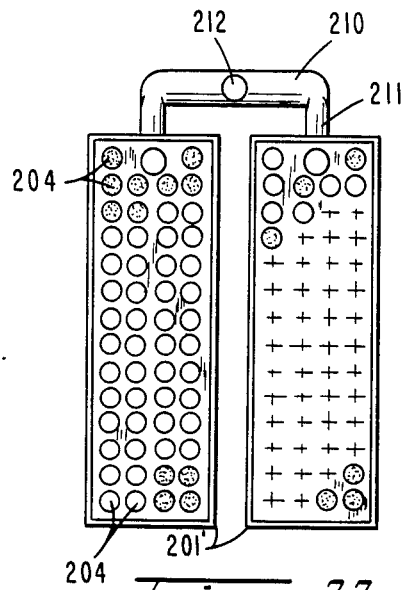
FIG. 22 is a front view of a frame of two tufted nail brushes as manufactured in accordance with the present invention illustrating an additional connector means.
Figure 24:
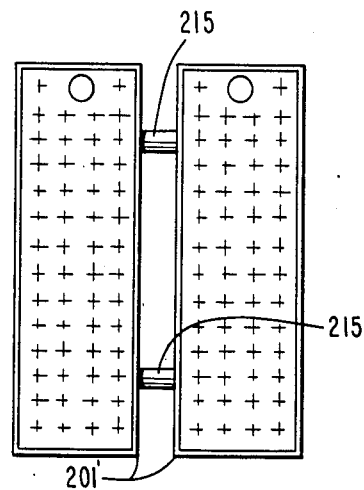
FIG. 24 is a front view of a frame of two tufted nail brushes as manufactured in accordance with the present invention illustrating yet an additional connector means.

FIGS. 20 to 24 illustrate further embodiments for creating a display package for hanging two or more brushes from a common frame member. In FIG. 20, the ring means is attached through runner frame member 206 and gate 207. In FIG. 21, a single runner/gate 209 connects two nail scrub brushes 201' containing filament tufts 204. The long, thin runner/gate 209 acts as a stiff connecting member between the two brushes, while, in the case of nail scrub brush 201', the hole in the actual brush block may act as the hang-up or display means. FIGS. 22 to 24 illustrate gate means 211, 213 and 215 respectively, whereby these gate/runner means act as the hanger means for displaying the brush sets. It is possible to form up to 1,320 nail scrub brushes per hour, each containing forty-four individual filament tufts. The fastest stapling known can only tuft approximately 660 units.

With reference to FIGS. 9 to 14, the process for fusing tufts to be mounted on the individual, integral brush backs formed within the frame of this invention is similar to that disclosed in my above-identified patents, the disclosure of which are hereby incorporated by reference. A tuft-forming picker device 300 is illustrated in FIG. 9. Such a picker device 300 typically uses cut-to-length filaments. It is possible, however, to employ other methods using, for example, continuous filament tow directed to a picking device from a reel of filament.

Tuft-forming device 300 has positioned thereon, with reference to frame 100, eight individual brush-designs of tuft pickers 302 and 304 so that eight individual toothbrushes can be simultaneously tufted with fused tufts. The pickers 302 and 304 are positioned so that they register with the moulded tuft-receiving depressions on the injected mould frame so that alignment takes place so that the pickers will be aligned with the tuft-receiving depressions during tufting.

Picker plate 300 is initially indexed into a filament stock box in the direction of arrow F shown in FIG. 11 and simultaneously a vibrator plate 310 is moved through direction G-G'. As illustrated in FIG. 12, the pickers 302 and 304 on the plate 300 are filled with filament and then withdrawn by withdrawing the plate 300 in the direction of arrow H. The picker plate 300 can subsequently be indexed into a melter plate 311 in order to fuse the ends of the individual filaments 309 in all picker sections 302 and 304 simultaneously. Upon melting of the filament ends 309, the picker plate 300 is indexed to frame 100 containing the toothbrush handles 101 and subsequently pushed into the premoulded acceptance holes as illustrated in FIG. 14, thus instantly creating eight tufted (fused) toothbrushes 101' as illustrated in FIG. 15.

In summary, the method of the present invention comprises preparing a moulded frame having integral therewith a plurality of brush block (substrates) together with gates interconnecting the frame and the brush blocks. A runner whereby the block can be separated from the runner (frame) at the point of attachment is used. Separation is achieved by severing the gate.

The frame 100, 200 is initially inserted into a holding means (not shown). Individual apertures are normally formed in the brush blocks by conventional means for receiving fused tuft ends. A picking attachment is used having the design of the brush blocks in the frame for simultaneously picking tufts of filament. The end of each tuft is then fused simultaneously on a heated plate. The picking attachment then is indexed into the frame-holding means whereby the fused end of each tuft is simultaneously inserted into the brush block tuft-receiving apertures to form simultaneously a plurality of brushes on a single frame. The tuft-picking device is then indexed away from the frame-holding means leaving the tufts mounted on the brush backs whereby simultaneously a plurality of brush constructions will be formed. The frame containing brushes may then be packaged and marketed, or the individual brushes may be separated from the frame for individual marketing by severing the gates interconnecting the frame with the brush backs.

The toothbrushes of this present invention are moulded in such a fashion that the tufting head portions are thinner than any known toothbrushes to date, since the only other method to manufacture a toothbrush is by stapling. In the instant invention, the fusing process allows one to fuse filament integrally with the head section having thicknesses of the order of 2 to 3 mm, while most conventional toothbrushes must start with at least a minimum of 5 mm. This savings in the head material amounts to up-to fifty percent, and combining this thin toothbrush head with an integrally connected hanger means results in a finished package of toothbrushes having the lowest cost of any known toothbrush.

Not only is the economic factor important, but the thinness also contributes to the only know toothbrush having the ability to reach further into one's mouth and behind the back molars, without giving the user inteference between the teeth and inner cheek with a thick brush head. The thin head section 111 is illustrated in FIG. 4 as well as thin section 112 of the same figure. Both these tuft receiving sections are thinner than the main body section of the handle, which is not true of conventional toothbrushes.

As will be obvious to those skilled in the art, the method of this invention will dramatically reduce the steps necessary to form a plurality of brushes whereby production may be dramatically increased and labor reduced.

The brush constructions of the instant invention will provide tufted products having a greater utility and brushing action without sacrificing quality even though less raw materials are utilized and the integral display means attached thereon.

This invention may be practiced by employing thermoplastic moulding materials, such as polypropylene, polystyrene, high impact polystyrene, polyurethane, polyamide, and the like. Filaments employed for fused tufts can be obtained from thermoplastic resins, such as polypropylene, polyamide, polyurethane, polyester, and the like.

The invention may be embodied in other specific forms which fall within the scope for the following claims.

What is claimed is:
1. An improved brush package comprising:
a plurality of brushes, each brush consisting of a plastic brush back and a plurality of synthetic cut-to-length filament tufts fused thereonto; an integral plastic runner forming a frame, and severable gates interconnecting each of said brush backs at an end thereof to said runner whereby said brush backs, runner and gates may be simultaneously molded for subsequent tufting; and an integral hook means mounted on said runner for displaying said package.

2. The package of claim 1 wherein said brushes are toothbrushes having a brush head and a handle.

3. The package of claim 2 wherein the toothbrush heads have a thickness of no more than about 4 mm.

4. The package of claim 2 wherein the gates connect the handle and the runner.

5. The package of claim 2 wherein the gates connect the brush back and runner at a single point only.

6. The package of claim 1 wherein said brushes consist of a tufted brush back and said tufts are mutually spaced substantially over an entire surface thereof.

7. The package of claim 1 wherein at least two different types of brushes are connected to said runner.

8. The package of claim 1 wherein said runner, gates, hook means and brush back are formed of polypropylene resin.

9. The package of claim 1 wherein said runner, gates hook means and brush back are formed of polyester resin.

10. The package of claim 1 wherein said runner, gates, hook means and brush back are formed of polyamide resin.

11. The package of claim 1 wherein said runner, gates, hook means and brush back are formed of polystyrene resin.

* * * * *